US012570788B2

(12) United States Patent
Lin et al.

(10) Patent No.: US 12,570,788 B2
(45) Date of Patent: Mar. 10, 2026

(54) METHOD OF PREPARING BIO-BASED WATERBORNE POLYURETHANE INTERMEDIATE, BIO-POLYURETHANE-ACRYLIC HYBRID FLUORINE-FREE WATER REPELLENT AND THE APPLICATION THEREOF

(71) Applicant: JINTEX CORPORATION LTD., Taipei (TW)

(72) Inventors: Yee-Fung Lin, Taipei (TW); Jo-Chun Chen, Taipei (TW); Zih-Hao Cheng, Taipei (TW)

(73) Assignee: JINTEX CORPORATION LTD., Taipei (TW)

( * ) Notice: Subject to any disclaimer, the term of this patent is extended or adjusted under 35 U.S.C. 154(b) by 509 days.

(21) Appl. No.: 18/116,726

(22) Filed: Mar. 2, 2023

(65) Prior Publication Data

US 2024/0301121 A1 Sep. 12, 2024

(51) Int. Cl.

| | |
|---|---|
| ***C08G 18/61*** | (2006.01) |
| ***C08G 18/22*** | (2006.01) |
| ***C08G 18/32*** | (2006.01) |
| ***C08G 18/34*** | (2006.01) |
| ***C08G 18/65*** | (2006.01) |
| ***C08G 18/73*** | (2006.01) |
| ***C08G 81/02*** | (2006.01) |
| ***C09D 175/04*** | (2006.01) |
| *C08G 18/08* | (2006.01) |

(52) U.S. Cl.

CPC ........... *C08G 18/61* (2013.01); *C08G 18/222* (2013.01); *C08G 18/3218* (2013.01); *C08G 18/341* (2013.01); *C08G 18/6517* (2013.01); *C08G 18/73* (2013.01); *C08G 81/024* (2013.01); *C09D 175/04* (2013.01); *C08G 18/0866* (2013.01)

(58) Field of Classification Search

CPC .............................. C08L 75/04; C09D 175/04

See application file for complete search history.

(56) References Cited

U.S. PATENT DOCUMENTS

2014/0235814 A1* 8/2014 Cramail ................. C07H 13/04 528/48

2023/0037578 A1* 2/2023 Kouda ............... C08G 18/7831

FOREIGN PATENT DOCUMENTS

CN 114454430 A * 7/2020

CN 114605614 A * 6/2022 ......... C08G 18/4825

OTHER PUBLICATIONS

"Glycolipids as a Source of Polyols for the Design of Original Linear and Cross-linked Polyurethanes" authored by Boyer et al. and published in Polymer Chemistry 2013, 4, 296-306.*

"Challenges and Recent Advances in Bio-based Isocyanate Production" authored by Niesiobedzka et al., and published in Green Chemistry 2023, 25, 2482-2504.*

Bio-based Di/polyisocyanates for Polyurethanes: an Overview published in PU Today, Dec. 2017, p. 41-46 and available at https://www.researchgate.net/publication/322696731.*

* cited by examiner

*Primary Examiner* — Marc S Zimmer

(74) *Attorney, Agent, or Firm* — Birch, Stewart, Kolasch & Birch, LLP

(57) ABSTRACT

The present disclosure provides a method of preparing a bio-based waterborne polyurethane intermediate. The method comprises the following steps: (a) mixing bio-based isocyanate compound, sorbitol, fatty acid-substituted glycolipid, dihydroxyl-terminated polydialkylsiloxane, and a solvent; (b) adding a first initiator to a mixture of step (a) to carry out polymerization; and (c) adding water, an emulsifier, and acetic acid to the product of step (b) to form the bio-based waterborne polyurethane intermediate. The present disclosure also provides a method of preparing a bio-based polyurethane-acrylic hybrid fluorine-free water repellent. The bio-based polyurethane-acrylic hybrid fluorine-free water repellent is derived from aforesaid bio-based waterborne polyurethane intermediate and an acrylic-based fluorine-free water repellent.

19 Claims, No Drawings

METHOD OF PREPARING BIO-BASED WATERBORNE POLYURETHANE INTERMEDIATE, BIO-POLYURETHANE-ACRYLIC HYBRID FLUORINE-FREE WATER REPELLENT AND THE APPLICATION THEREOF

BACKGROUND OF THE INVENTION

Field of the Invention

The disclosure relates to a bio-based fluorine-free water repellent, in particular to a polyurethane-acrylic hybrid water repellent and a method of preparing the same.

Description of the Prior Art

Textile-oriented water-repellent finishing agents are no new concept. In 1950, E. I. du Pont de Nemours (USA) firstly applied polytetrafluoroethylene emulsion in textile for water repellence and oil repellence. Years later, 3M Company developed a fabric-oriented fluorine-containing water repellent commercially known as "Scotchgard", and since then, the era of using fluorine monomer-containing water repellents began. Nevertheless, fluorine-containing water repellents have environmental hazards and carcinogenic risks and therefore do not comply with the requirements of environmental protection. Therefore, fluorine-free water repellents of using organic acrylic polymers, dendrimers, polyurethane, wax mixture, organic silicon, inorganic-organic mixing materials, or nano-metal-particle mixing materials as the main component had been launched. Unfortunately, among them, only the acrylic polymers, dendrimers, and waterborne polyurethane of them exhibited promised water-repellent effect and still be used now.

However, waterborne polyurethane has to be produced in complicated synthesis steps, under severe reaction conditions, and even by a specific dispersion technique, thereby being sold at an unattractively high price. Although dendrimers and acrylic polymers are advantageously cheap, they are rather limited in application and especially very selective in their application to the types of fabrics. Furthermore, polyurethane polymers are likely to be disadvantaged by poor dispersion, storage issues and low usage stability. Conventional fluorine-free water repellents, as disclosed in TW 1491721, U.S. Pat. No. 9,234,311 B2, and CN 104788628 B, are imperfect in fabric/texture versatility, color difference of processed fabrics, and washability of processed fabrics.

In recent years, the issues about carbon emission, carbon footprint, and carbon credit spark a hot debate on the use of bio-based ingredients and the reduced use of petrochemical ingredients. Bio-based ingredients are not from petroleum refining process and are usually produced from biological substrates, such as plants, animals and bacteria.

The biomass content of commercially-available fluorine-free water repellent products mostly ranges from 30% to 60%. Fluorine-free water repellents with high biomass content above 60% have not yet been widely commercially available.

Market surveys and studies show that many high biomass content water repellents are fake. The producer introduces extra bio-based ingredients, such as glycerin, starch and saccharide, to increase the biomass content of water repellents. However, no chemical bond is formed between the extra bio-based ingredients and the original water repellent, and thus these products rarely exhibit satisfactory water-repelling performance.

Owing to difficulties in the purification of bio-based ingredients, a water-repellent synthesized from bio-based ingredients usually comes in different isomers and hard to achieve expected conformational form and crystallization, thereby leading to poor water-repelling performance and low stability.

In conclusion, existing commercially-available bio-based fluorine-free water repellents rarely meet usage requirements. Therefore, it is imperative to provide a bio-based fluorine-free water repellent that features low selectivity in their application to the types of fabrics, low cost, low-carbon footprint, high biomass content, high stability and high quality.

SUMMARY OF THE INVENTION

The present disclosure provides a method of preparing a bio-based waterborne polyurethane intermediate. The method comprises the following steps:

(a) mixing 2.0 to 10.0 parts by weight of bio-based isocyanate compound, 10.0 to 20.0 parts by weight of sorbitol, 1.0 to 7.0 parts by weight of fatty acid-substituted glycolipid, 1.0 to 10.0 parts by weight of dihydroxyl-terminated polydialkylsiloxane, and 5.0 to 15.0 parts by weight of a solvent;

(b) adding 0.05 to 0.3 part by weight of a first initiator to a mixture of step (a) to carry out polymerization; and (c) adding 50.0 to 70.0 parts by weight of water, 1.0 to 4.0 parts by weight of an emulsifier, and 0.2 to 0.8 part by weight of acetic acid to the product of step (b) to form the bio-based waterborne polyurethane intermediate.

In one embodiment, the bio-based isocyanate is bio-based pentamethylene diisocyanate, bio-based pentamethylene diisocyanate trimer, or a combination thereof.

In one embodiment, the sorbitol is sorbitan monostearate, sorbitan tristearate, or a combination thereof.

In one embodiment, the fatty acid-substituted glycolipid is a $C_{16}$-$C_{70}$ fatty acid-substituted glycolipid, with the substituent involving at least one fatty acid group derived from stearic acid, lauric acid or palmitic acid.

In one embodiment, the fatty acid-substituted glycolipid has a structure depicted below:

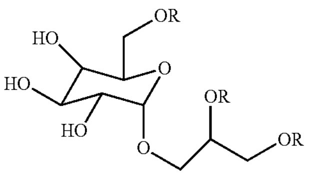

where R=H or $—OC(CH_2)_nCH_3$, and n=3-20.

In one embodiment, the bio-based isocyanate compounds, the sorbitan stearate compounds, and the fatty acid-substituted glycolipid each have a biomass content of 50% to 100%.

In one embodiment, the dihydroxyl-terminated polydialkylsiloxane is dihydroxyl-terminated polydimethylsiloxane of a weight-average molecular weight of 200 to 4000.

In one embodiment, the first initiator is a thermal initiator with an initiation temperature of 30 to 90° C.

In one embodiment, the first initiator is 2,2'-azobis(2,4-dimethylpentanenitrile), benzoyl peroxide, 2,2'-azobis(2-methylpropionamidine)dihydrochloride, tetrabutyl titanate, or a combination thereof.

The present disclosure also provides a bio-based waterborne polyurethane intermediate prepared by the aforesaid method.

The present disclosure further provides a method of preparing a bio-based polyurethane-acrylic hybrid fluorine-free water repellent. The water repellent is derived from a bio-based waterborne polyurethane intermediate and an acrylic-based fluorine-free water repellent. The method comprises the following steps:

(a) mixing 5.0 to 20.0 parts by weight of wax, 5.0 to 10.0 parts by weight of unsaturated monomers, 3.0 to 6.0 parts by weight of a solvent, 60.0 to 75.0 parts by weight of water, and 1.0 to 4.0 parts by weight of an emulsifier;

(b) adding 0.1 to 0.5 part by weight of a second initiator to a mixture of step (a) to carry out polymerization and thereby obtain a water repellent; and (c) mixing 1.0 to 99.0 parts by weight of the water repellent of step (b), 1.0 to 99.0 parts by weight of the aforesaid waterborne polyurethane intermediate, and 0.1 to 0.5 part by weight of a third initiator to carry out polymerization and thereby obtain the bio-based polyurethane-acrylic hybrid fluorine-free water repellent.

In one embodiment, step (c) occurs at 50 to 90° C. and 0.5 to 2.0 $kgf/cm^2$.

In one embodiment, the method of preparing a bio-based polyurethane-acrylic hybrid fluorine-free water repellent further comprises step (d) mixing the bio-based polyurethane-acrylic hybrid fluorine-free water repellent of step (c) with a binder.

The present disclosure also provides a bio-based polyurethane-acrylic hybrid fluorine-free water repellent prepared by the aforesaid method.

In one embodiment, the biomass content of the bio-based polyurethane-acrylic hybrid fluorine-free water repellent is greater than 60%.

The present disclosure also provides a surface-modified article, comprising a substrate having a surface coated with the aforesaid bio-based polyurethane-acrylic hybrid fluorine-free water repellent.

In one embodiment, the substrate is fabric, leather, paper, or a combination thereof.

To sum up, the present disclosure is related to a method of preparing a bio-based polyurethane-acrylic hybrid fluorine-free water repellent. The water repellent prepared by the present method not only has the advantage of substantially having high biomass content but also has the property of high stability. The present disclosure provides the field with a novel choice of water repellent that is more in line with the demand of the industry.

DETAILED DESCRIPTION OF THE EMBODIMENTS

The disclosure relates to a bio-based polyurethane-acrylic hybrid fluorine-free water repellent and a method of preparing the same. Conventional preparation processes of a fluorine-free water repellent are complicated, expensive and unstable. By contrast, the method of preparing a bio-based polyurethane-acrylic hybrid fluorine-free water repellent according to the disclosure is simple to carry out, and the water repellent thus prepared exhibits satisfactory stability and has a high biomass content.

As its name suggests, the bio-based polyurethane-acrylic hybrid fluorine-free water repellent of the disclosure is composed of a polyurethane component and an acrylic component. The polyurethane component is a bio-based waterborne polyurethane intermediate. The acrylic component is an acrylic-based fluorine-free water repellent. The method of the disclosure can be separated into two parts: a homogeneous polymerization step and a polymerization step.

Homogeneous Polymerization Step

The method of preparing the polyurethane component, i.e., waterborne polyurethane intermediate, comprises a homogeneous polymerization step in which polyurethane raw materials undergo a polymerization reaction to form a heterogeneous mixture, and then the heterogeneous mixture mixes with water under appropriate homogenization conditions to form a stable waterborne polyurethane intermediate.

The present disclosure provides a waterborne polyurethane intermediate comprising the following ingredients: 2.0 to 10.0 parts by weight of bio-based isocyanate compound, 10.0 to 20.0 parts by weight of sorbitol, 1.0 to 7.0 parts by weight of fatty acid-substituted glycolipid, 1.0 to 10.0 parts by weight of dihydroxyl-terminated polydialkylsiloxane, 5.0 to 15.0 parts by weight of a solvent, 0.05 to 0.3 part by weight of an initiator, 50.0 to 70.0 parts by weight of water, 1.0 to 4.0 parts by weight of an emulsifier and 0.2 to 0.8 part by weight of acetic acid.

The preparation of the waterborne polyurethane intermediate is divided into two stages: introducing bio-based isocyanate compound, sorbitol, fatty acid-substituted glycolipid, dihydroxyl-terminated polydialkylsiloxane, solvent and initiator to which a polymerization reaction occurs, and then introducing water, an emulsifier, acetic acid and wax to which homogenization occurs so that immiscible ingredients turn into stable, uniformly-distributed liquid suspended matters.

The person having ordinary skill in the field may carry out the aforesaid mixing, polymerization and homogenization step with suitable conditions (temperature, pressure, etc.) according to demand, so as to obtain the water-based polyurethane intermediate. Preferably, the temperature of polymerization and/or homogenization are at 50 to 95° C. to obtain the waterborne polyurethane intermediate. More preferably, the aforesaid ingredients are polymerized and/or homogenized for 0.1 to 5.0 hours at a temperature of 50 to 95° C. and a pressure of 100 to 600 $kgf/cm^2$ to obtain the waterborne polyurethane intermediate.

The aforesaid bio-based isocyanate is, for example, but not limited to, bio-based pentamethylene diisocyanate, bio-based pentamethylene diisocyanate trimer or a combination thereof.

The aforesaid sorbitol is, for example, but not limited to, sorbitan monostearate, sorbitan tristearate, or a combination thereof.

The aforesaid fatty acid-substituted glycolipid is, for example, but not limited to, a $C_{16}$-$C_{70}$ fatty acid-substituted glycolipid with the substituent involving at least one fatty acid group derived from stearic acid, lauric acid or palmitic acid. Preferably, the fatty acid-substituted glycolipid has a structure depicted below:

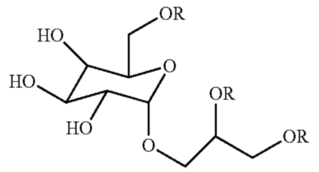

where R is H or $—OC(CH_2)_nCH_3$, and n is 3 to 20.

The isocyanate compounds, sorbitan stearate compounds and fatty acid-substituted glycolipid of the present disclosure are originated from bio-based sources and not derived from crude oil. That is, biological substrates of these compounds/copolymers are from plants, bacteria or animal fat, and these compounds/copolymers have biomass content ranging from 50% to 100%.

The carbon-14 content of petrochemical raw materials is extremely low. Thus, the biomass content of a bio-based ingredient can be calculated by assaying its carbon-14 isotope content. This technique is widely applied to discerning and calculating a petrochemical source and a bio-based source.

The United States Department of Agriculture (USDA) gives definite definitions to bio-based products and requires bio-based products to undergo carbon-14 assays, to be verified as having a biomass content greater than 25% in order to meet standard criteria, and obtain Certified Biobased labels issued by the USDA, so as to be known as “bio-based material.”

The solvent has a boiling point of 50 to 200° C. and is, for example, but not limited to, methyl isobutyl ketone, methyl ethyl ketone (MEK), propylene glycol, dipropylene glycol methyl ether, 4-oxa-2,6-heptanediol, acetone, or a combination thereof.

The emulsifier is a cationic emulsifier, an anionic emulsifier, a nonionic emulsifier, or a combination thereof. Specific compounds include, but are not limited to, octadecyl trimethyl ammonium chloride, stearyl alcohol polyoxyethylene, oxyethylated lauryl alcohol, oxyethylated oleyl alcohol, polyethylene glycol trimethyl nonyl ether, and a combination thereof.

The dihydroxyl-terminated polydialkylsiloxane is, but not limited to, dihydroxyl-terminated polydimethylsiloxane of a weight-average molecular weight (Mw) of 200 to 4000 as follows:

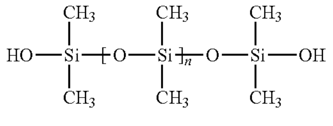

The aforesaid initiator is a thermal initiator with an initiation temperature of 30 to 90° C. For example, but not limited to, the initiator is 2,2'-azobis(2,4-dimethylpentanenitrile), benzoyl peroxide, 2,2'-azobis(2-methylpropionamidine)dihydrochloride, tetrabutyl titanate, or a combination thereof.

Polymerization Step

After the homogeneous polymerization step has finished to obtain a waterborne polyurethane intermediate, the polymerization step starts. In the polymerization step, an initiator is introduced to initiate a polymerization reaction of a known acrylic-based fluorine-free water repellent intermediate and a waterborne polyurethane intermediate. The known acrylic-based fluorine-free water repellent intermediate is the fluorine-free water repellent of U.S. Pat. No. 9,234,311 B2, and the entire contents of which are hereby incorporated by reference.

The acrylic-based fluorine-free water repellent intermediate of U.S. Pat. No. 9,234,311 B2 is obtained by mixing 5.0 to 20.0 parts by weight of wax, 5.0 to 10.0 parts by weight of unsaturated monomers, 3.0 to 6.0 parts by weight of a solvent, 60.0 to 75.0 parts by weight of water, and 1.0 to 4.0 parts by weight of an emulsifier and then adding 0.1 to 0.5 part by weight of an initiator to the mixture to carry out a polymerization reaction.

The unsaturated monomers used in the acrylic-based fluorine-free water repellent intermediate is: a $C_6$-$C_{50}$ carbon chain having an unsaturated functional group and/or a $C_6$-$C_{50}$ aromatic having an unsaturated functional group; the unsaturated functional group comprises acrylic group, methacrylic group, vinyl group, or a combination thereof. Preferably, the substituted or unsubstituted $C_6$-$C_{50}$ unsaturated monomers is phenylethylene, stearyl acrylate, propyl acrylate, propyl methacrylate, glycidyl methacrylate, glycidyl acrylate, hydroxyethyl methacrylate, hydroxyethyl acrylate, 3-chloro-2-hydroxypropyl methacrylate, N-methylolacrylamide, N-(hydroxy)acrylamide, or a combination thereof.

The solvent, wax, emulsifier and initiator used in the homogeneous polymerization step are identical to or different from those used in the polymerization step, but the disclosure is not limited to.

In a specific embodiment, the polymerization step involves adding 0.1 to 0.5 part by weight of an initiator to 1.0 to 99.0 parts by weight of an acrylic-based fluorine-free water repellent intermediate (the fluorine-free water repellent of U.S. Pat. No. 9,234,311 B2) and then introducing 1.0 to 99.0 parts by weight of the bio-based waterborne polyurethane intermediate prepared in the homogeneous polymerization step to undergo a reaction, so as to obtain the bio-based polyurethane-acrylic hybrid fluorine-free water repellent of the disclosure. In a feasible embodiment, the polymerization step involves adding 0.1 to 0.5 part by weight of an initiator to 1 to 50 parts by weight of an acrylic-based fluorine-free water repellent intermediate (the fluorine-free water repellent of U.S. Pat. No. 9,234,311 B2) and then introducing 1 to 50 parts by weight of the waterborne polyurethane intermediate prepared in the homogeneous polymerization step.

Persons having ordinary skilled in the field can choose an appropriate initiator as needed. The method of preparing a bio-based polyurethane-acrylic hybrid fluorine-free water repellent entails carrying out the polymerization step three times: one intended for the waterborne polyurethane intermediate preparation method (homogeneous polymerization step), another intended to prepare a known acrylic-based fluorine-free water repellent intermediate (the fluorine-free water repellent of U.S. Pat. No. 9,234,311 B2), and yet another intended to polymerize two intermediates. However, in a preferred embodiment, the initiators used in the three polymerization steps are similar (identical or different) and are thermal initiators with an initiation temperature of 30 to 90° C.

Feasibly, the polymerization reaction occurs at 30 to 90° C. or at 50 to 90° C. Preferably, the polymerization reaction occurs at 50 to 90° C. and 0.5 to 2.0 kgf/$cm^2$ in the presence of nitrogen gas.

In a preferred embodiment, when the temperature of the polymerization reaction decreases to 45° C., a filtering step is carried out to obtain a product (i.e., the bio-based polyurethane-acrylic hybrid fluorine-free water repellent of the disclosure) by filtration.

The present disclosure substantially comprises no fluorine-containing component. Said "substantially comprises no fluorine-containing component" means there is no any fluorine-containing materials used in the present method and there is no need to add any fluorine-containing component no matter what purpose is in the present disclosure. Nevertheless, those having ordinary skill in the chemical field can be understood that it is almost impossible to one hundred percent exclude the existence of a particular element or compound. Usually, the detection of the existence of a particular element or compound can at most be determined as "no detection" or "in an extremely low content". Furthermore, the limitation of "substantially comprises no fluorine-containing component" is to distinctly define that the present water repellent is a fluorine-free water repellent in comparison with the conventional fluorine-containing water repellent. Accordingly, the limitation of "substantially comprises no fluorine-containing component" to the present invention shall be clear and doubtless to those having ordinary skill in the art.

The present disclosure provides a bio-based polyurethane-acrylic hybrid fluorine-free water repellent prepared by the aforesaid method. The water repellent prepared by the present disclosure is substantially free of fluorine-containing component and has superior stability. Said "substantially free of fluorine-containing component" is defined as set forth in the preceding paragraphs. A water repellent of poor stability tends to precipitate while storage; whereas, the present water repellent exhibits high stability therefore no precipitation generates after 90 or 180 days of storage. The superior stability results from a proper formulation of each material, which formed a micelle encapsulated by emulsifier, polyurethane and acrylic in the reaction. Consequently, the components with low water solubility can be evenly distributed in the water repellent, which therefore becomes a stable emulsion.

The bio-based polyurethane-acrylic hybrid fluorine-free water repellent prepared with the method has a high biomass content. The high biomass content means that the biomass content (carbon-14 isotope content) of the water repellent is greater than 60% to thereby exhibit satisfactory product stability and satisfactory water-repelling performance, with the product characteristics not being affected by a mixture contained in bio-based ingredients.

The present invention further provides a modification method of an object for providing at least one surface of said object with a water-repellent property. Said modification method comprises coating a water-repellent layer formed by the present bio-based polyurethane-acrylic hybrid fluorine-free water repellent on a surface of said object and then heating said object coated with said water-repellent layer.

In a preferable embodiment, said bio-based polyurethane-acrylic hybrid fluorine-free water repellent is mixed with a diluent to form a working solution. Said working solution comprises 10 to 150 g/L of said water repellent, which is based on the total volume of said dilute. Preferably, said diluent is water. In a preferable embodiment, said working solution further comprises 2 to 30 g/L of a binder, which is based on the total volume of said dilute. For example, the binder is, but not limited to, JintexEco FCH, JintexEco KLC or JintexEco CAT-60 (Applicant's product).

Said working solution is applied to a surface of said object to form said water-repellent layer. Those having ordinary skill in the field can choose, based on their needs, any desired manner for forming said water-repellent layer. Case in point, said water-repellent layer can be formed by evenly spraying said working solution on a surface of said object; or by immersing said object into a bath of said working solution to evenly moisten a surface of said object with the working solution, and then pressing the surface by a roller to absorb the attached working solution to the surface.

In a preferable embodiment, said heating is to heat said object coated with said water repellent at a temperature of 120° C. for at least 90 seconds. More specifically, said heating comprises a first step and a second step; said first step is to heat said object coated with said water repellent at a temperature of 120 to 140° C. for 110 to 130 seconds; and said second step is to heat said object coated with said water repellent at a temperature of 150 to 170° C. for 80 to 100 seconds.

In another aspect of the present disclosure, the present disclosure provides a modified object; wherein a surface of said object is coated with said bio-based polyurethane-acrylic hybrid fluorine-free water repellent. More specifically, at least one surface of said object is coated with a water-repellent layer formed by said water repellent. The method for forming said water-repellent layer comprises using said water repellent as set forth in the preceding paragraphs.

In an alternative embodiment, said object is a texture, for example, without limitation: a texture of polyester, nylon, or a combination thereof. In another alternative embodiment, said object is a leather, for example, without limitation: cattle hide, sheepskin, or a combination thereof. In another alternative embodiment, said object is a paper.

The following embodiments recited the experiments and trials during the development of the present disclosure for further clarifying the features and advantages of the present disclosure. It shall be appreciated that the listing embodiments are only exemplary and shall not limit the claim scope of the present disclosure.

Embodiment 1: Preparation of the Bio-Based Polyurethane-Acrylic Hybrid Fluorine-Free Water Repellent of the Disclosure (1) Preparation of a Waterborne Polyurethane Intermediate 6.0 parts by weight of bio-based pentamethylene diisocyanate trimer, 16.0 parts by weight of sorbitan tristearate, 8.0 parts by weight of dihydroxyl-terminated polydimethylsiloxane, 0.2 part by weight of tetrabutyl titanate, and 15.0 parts by weight of methyl ethyl ketone (MEK) are introduced into a chamber filled with nitrogen gas. The chamber is heated up to 75° C., and this temperature is maintained for 6 hours. Then, at 75° C., 55.0 parts by weight of deionized water, 2.0 parts by weight of trimethylstearylammonium chloride and lauryl alcohol ethoxylate in total, and 0.8 part by weight of acetic acid are introduced into the chamber and stirred for 3 hours. Next, the mixture in the chamber undergoes homogenization at 200 kgf/cm$^2$. After that, the mixture in the chamber undergoes distillation at reduced pressure. As soon as the reactants cool down to 45° C. (the temperature shown on the chamber), the filtering step is carried out to obtain a waterborne polyurethane intermediate-A.

(2) Preparation of a Bio-Based Polyurethane-Acrylic Hybrid Fluorine-Free Water Repellent Sample A: 50.0 parts by weight of waterborne polyurethane intermediate A obtained in step (1), 49.8 parts by weight of a known acrylic-based fluorine-free water repellent intermediate (fluorine-free water repellent of U.S. Pat.

No. 9,234,311 B2), and 0.2 part by weight of benzoyl peroxide (initiator) are mixed in a chamber filled with nitrogen gas. Then, the mixture in the chamber is heated up to 70° C. Next, the mixture in the chamber is stirred for 4.0 hours at 70° C. After that, the stirring rotation speed is reduced. As soon as the reactants cool down to 45° C. (the temperature shown on the chamber), the filtering step is carried out to obtain a bio-based polyurethane-acrylic hybrid fluorine-free water repellent sample A.

In this embodiment, the acrylic-based fluorine-free water repellent intermediate is the water repellent of sample 4 of U.S. Pat. No. 9,234,311 B2 and is prepared from 12.0 parts by weight of paraffin, 1.5 parts by weight of styrene, 5.0 parts by weight of stearyl acrylate, 3.0 parts by weight of propyl methacrylate (the aforesaid three compounds are unsaturated monomers), 4.5 parts by weight of propylene glycol (solvent), 60.0 parts by weight of deionized water, 2.2 parts by weight of octadecyl trimethyl ammonium chloride and stearyl alcohol polyoxyethylene (emulsifier) in total, 6.5 parts by weight of vinyl-terminated polydimethylsiloxane and 0.3 part by weight of 2,2'-Azodiisobutyramidine dihydrochloride (initiator). However, the disclosure is not limited to the acrylic-based fluorine-free water repellent intermediate prepared in accordance with the aforesaid ingredients proportions, all compounds equivalent to the fluorine-free water repellent disclosed in U.S. Pat. No. 9,234,311 B2 can function as the acrylic-based fluorine-free water repellent intermediate of the disclosure.

Sample B: 8.0 parts by weight of dihydroxyl-terminated polydimethylsiloxane used in step (1) is replaced by 7.0 parts by weight of the dihydroxyl-terminated polydimethylsiloxane and 1.0 part by weight of multiple fatty acid-substituted glycolipid while keeping the other monomers, adjuvant quantity and reaction process unchanged, to obtain a waterborne polyurethane intermediate-B.

50.0 parts by weight of the waterborne polyurethane intermediate-B and 49.8 parts by weight of an acrylic-based fluorine-free water repellent intermediate (the fluorine-free water repellent of U.S. Pat. No. 9,234,311 B2) are mixed. Then, the mixture is mixed with 0.2 part by weight of benzoyl peroxide (initiator) in a chamber filled with nitrogen gas. Then, the mixture in the chamber is heated up to 70° C. Next, the mixture in the chamber is stirred for 4 hours at 70° C. After that, the stirring rotation speed is reduced. As soon as the reactants cool down to 45° C. (the temperature shown on the chamber), the filtering step is carried out to obtain a bio-based polyurethane-acrylic hybrid fluorine-free water repellent sample B.

Sample C: 8.0 parts by weight of dihydroxyl-terminated polydimethylsiloxane used in step (1) is replaced by 5.0 parts by weight of the dihydroxyl-terminated polydimethylsiloxane and 3.0 parts by weight of multiple fatty acid-substituted glycolipid while keeping the other monomers, adjuvant quantity and reaction process unchanged, to obtain a waterborne polyurethane intermediate-C.

50.0 parts by weight of the waterborne polyurethane intermediate-C and 49.8 parts by weight of an acrylic-based fluorine-free water repellent intermediate (the fluorine-free water repellent of U.S. Pat. No. 9,234,311 B2) are mixed. Then, the mixture is mixed with 0.2 part by weight of benzoyl peroxide (initiator) in a chamber filled with nitrogen gas. Then, the mixture in the chamber is heated up to 70° C. Next, the mixture in the chamber is stirred for 4.0 hours at 70° C. After that, the stirring rotation speed is reduced. As soon as the reactants cool down to 45° C. (the temperature shown on the chamber), the filtering step is carried out to obtain a bio-based polyurethane-acrylic hybrid fluorine-free water repellent sample C.

Sample D: 90.0 parts by weight of a waterborne polyurethane intermediate-C and 9.8 parts by weight of an acrylic-based fluorine-free water repellent intermediate (the fluorine-free water repellent of U.S. Pat. No. 9,234,311 B2) are mixed. Then, the mixture is mixed with 0.2 part by weight of benzoyl peroxide (initiator) in a chamber filled with nitrogen gas. Next, the mixture in the chamber is heated up to 70° C. After that, the mixture in the chamber is stirred for 4.0 hours at 70° C. Then, the stirring rotation speed is reduced. As soon as the reactants cool down to 45° C. (the temperature shown on the chamber), the filtering step is carried out to obtain a bio-based polyurethane-acrylic hybrid fluorine-free water repellent sample D.

Sample E: 8.0 parts by weight of dihydroxyl-terminated polydimethylsiloxane used in step (1) is replaced by 3.0 parts by weight of the dihydroxyl-terminated polydimethylsiloxane and 5.0 parts by weight of multiple fatty acid-substituted glycolipid while keeping the other monomers, adjuvant quantity and reaction process unchanged, to obtain a waterborne polyurethane intermediate-D.

90.0 parts by weight of the waterborne polyurethane intermediate-D and 9.8 parts by weight of an acrylic-based fluorine-free water repellent intermediate (the fluorine-free water repellent of U.S. Pat. No. 9,234,311 B2) are mixed. Then, the mixture is mixed with 0.2 part by weight of benzoyl peroxide (initiator) in a chamber filled with nitrogen gas. Then, the mixture in the chamber is heated up to 70° C. Next, the mixture in the chamber is stirred for 4 hours at 70° C. After that, the stirring rotation speed is reduced. As soon as the reactants cool down to 45° C. (the temperature shown on the chamber), the filtering step is carried out to obtain a bio-based polyurethane-acrylic hybrid fluorine-free water repellent sample E.

Sample F: 8.0 parts by weight of dihydroxyl-terminated polydimethylsiloxane used in step (1) is replaced by 1.0 part by weight of the dihydroxyl-terminated polydimethylsiloxane and 7.0 parts by weight of multiple fatty acid-substituted glycolipid while keeping the other monomers, adjuvant quantity and reaction process unchanged, to obtain a waterborne polyurethane intermediate-E.

90.0 parts by weight of the waterborne polyurethane intermediate-E and 9.8 parts by weight of an acrylic-based fluorine-free water repellent intermediate (the fluorine-free water repellent of U.S. Pat. No. 9,234,311 B2) are mixed. Then, the mixture is mixed with 0.2 part by weight of benzoyl peroxide (initiator) in a chamber filled with nitrogen gas. Then, the mixture in the chamber is heated up to 70° C. Next, the mixture in the chamber is stirred for 4 hours at 70° C. After that, the stirring rotation speed is reduced. As soon as the reactants cool down to 45° C. (the temperature shown on the chamber), the filtering step is carried out to obtain a bio-based polyurethane-acrylic hybrid fluorine-free water repellent sample F.

Formulations of bio-based waterborne polyurethane intermediates A-E and formulations of bio-based polyurethane-acrylic hybrid fluorine-free water repellent samples A-F in this embodiment are illustrated in Tables 1, 2 below.

TABLE 1

Formulations of bio-based waterborne polyurethane intermediates A-E, the unlisted ingredients and preparation processes of these intermediates are the same

| Bio-based waterborne polyurethane intermediate | Dihydroxyl-terminated polydimethylsiloxane (part by weight) | Fatty acid-substituted glycolipid (part by weight) |
|---|---|---|
| Intermediate -A | 8 | Nil |
| Intermediate -B | 7 | 1 |
| Intermediate -C | 5 | 3 |
| Intermediate -D | 3 | 5 |
| Intermediate -E | 1 | 7 |

TABLE 2

Formulations of bio-based polyurethane-acrylic hybrid fluorine-free water repellent

| Sample | Bio-based waterborne polyurethane intermediate (formulation [see table 1] and part by weight) | Known acrylic fluorine-free water repellent (part by weight) | Polymerization initiator (part by weight) | Remark |
|---|---|---|---|---|
| A | Intermediate -A 50.0 | 49.8 | 0.2 | Free of fatty acid-substituted glycolipid |
| B | Intermediate -B 50.0 | 49.8 | 0.2 | |
| C | Intermediate -C 50.0 | 49.8 | 0.2 | |
| D | Intermediate -C 90.0 | 9.8 | 0.2 | |
| E | Intermediate -D 90.0 | 9.8 | 0.2 | |
| F | Intermediate -E 90.0 | 9.8 | 0.2 | |

Embodiment 2: Assay and Comparison of the Water-Repelling Performance of the Bio-Based Polyurethane-Acrylic Hybrid Fluorine-Free Water Repellent Eight samples, i.e., samples A-F, commercially-available bio-based fluorine-free water repellent X (acrylic-based fluorine-free water repellent with a biomass content of 50%) and commercially-available bio-based fluorine-free water repellent Y (polyurethane-based fluorine-free water repellent with a biomass content of 58%) are assayed to evaluate their water-repelling performance of wash instantly, at the end of the 10$^{th}$ instance of washing, and at the end of the 20$^{th}$ instance of washing. The results are shown in Table 3 below.

TABLE 3

Results of assays of water-repelling performance of water repellents

| | Polyester fabric | | | Nylon fabric | | |
|---|---|---|---|---|---|---|
| | HL0 | HL10 | HL20 | HL0 | HL10 | HL20 |
| Bio-based fluorine-free water repellent sample A | 100 | 90– | 80 | 100 | 90– | 80 |
| Sample A (10% binder) | 100 | 90 | 90– | 100 | $90^+$ | 90 |
| Bio-based fluorine-free water repellent sample B | 100 | 90 | $80^+$ | 100 | $90^-$ | $80^+$ |
| Sample B (10% binder) | 100 | 100 | 90 | 100 | 90+ | 90 |
| Bio-based fluorine-free water repellent sample C | 100 | $90^+$ | 90 | 100 | $90^+$ | $90^-$ |
| Sample C (10% binder) | 100 | 100 | $90^+$ | 100 | 100 | $90^+$ |
| Bio-based fluorine-free water repellent sample D | 100 | $90^+$ | $90^+$ | 100 | $90^+$ | 90 |
| Sample D (10% binder) | 100 | 100 | $90^+$ | 100 | 100 | $90^+$ |
| Bio-based fluorine-free water repellent sample E | 100 | $90^+$ | $90^+$ | 100 | $90^+$ | 90 |
| Sample E (10% binder) | 100 | 100 | $90^+$ | 100 | 100 | $90^+$ |
| Bio-based fluorine-free water repellent sample F | 100 | 90 | $90^-$ | 100 | 90 | $80^+$ |
| Sample F (10% binder) | 100 | 100 | 90 | 100 | $90^+$ | $90^-$ |
| Commercially-available bio-based fluorine-free water repellent X | $90^+$ | 90 | $90^-$ | 90 | $90^-$ | $80^+$ |
| X (10% X-only binder) | $90^+$ | $90^+$ | 90 | $90^+$ | 90 | $90^-$ |
| Commercially-available bio-based fluorine-free water repellent Y | 100 | 90 | $90^-$ | $90^+$ | 90 | $90^-$ |
| Y (10% Y-only binder) | 100 | $90^+$ | 90 | 100 | $90^+$ | 90 |

1. The assays are conducted by following the rules of "AATCC-22 Water Repellency: Spray Test"; the higher the value is, the better the water-repelling performance is. (Water does not spread and seep into the fabric but forms water drops rolling thereon) The plus (+) means "just above," and the minus sign (–) means "just below," for example, 100 > 90+ > 90 > 90–.

2. HL0 denotes "no washing"; HL10 denotes "10$^{th}$ instances of washing"; HL20 denotes "20$^{th}$ instances of washing."

3. (10% binder) denotes adding a binder that equal to 10 wt % water repellent.

Table 3 shows that bio-based polyurethane-acrylic hybrid fluorine-free water repellent samples A-F of the disclosure are equal to or even surpass commercially-available bio-based fluorine-free water repellents X,Y in water-repelling performance, and shows that bio-based polyurethane-acrylic hybrid fluorine-free water repellent samples A-F of the disclosure still have satisfactory water-repelling performance even after multiple instances of washing. Furthermore, Table 3 shows that the introduction of a binder is conducive to the enhancement of water-repelling performance.

Table 3 shows that the introduction of bio-based fatty acid-substituted glycolipid to water repellent samples A-F is conducive to the enhancement of water-repelling performance but detrimental to water-repelling performance in the event of the introduction of an excessive amount. The water-repelling performance of samples E-F starts to reduce as soon as at least 7 parts by weight of fatty acid-substituted glycolipid is introduced to samples E-F but is still stronger than that of sample A which is free of fatty acid-substituted glycolipid.

Embodiment 3: Assay and Comparison of the Color Difference of the Bio-Based Polyurethane-Acrylic Hybrid Fluorine-Free Water Repellent Likewise, fluorine-free water repellent samples A-F of embodiment 1 are compared with commercially-available bio-based fluorine-free water repellents X,Y in terms of fabric type color difference. The results are shown in Table 4.

TABLE 4

| Results of assays of fabric type color difference (ΔE) of water repellents | Polyester fabric | | Nylon fabric | |
|---|---|---|---|---|
| | Olive green | Black | Bluish grey | Deep blue |
| Bio-based fluorine-free water repellent sample A | 1.33 | 0.41 | 0.83 | 2.35 |
| Bio-based fluorine-free water repellent sample B | 1.28 | 0.40 | 0.79 | 2.28 |
| Bio-based fluorine-free water repellent sample C | 1.04 | 0.25 | 0.56 | 1.83 |
| Bio-based fluorine-free water repellent sample D | 0.94 | 0.22 | 0.47 | 1.40 |
| Bio-based fluorine-free water repellent sample E | 0.88 | 0.22 | 0.46 | 1.29 |
| Bio-based fluorine-free water repellent sample F | 0.80 | 0.19 | 0.40 | 1.23 |
| Commercially-available bio-based fluorine-free water repellent X | 1.46 | 0.55 | 1.06 | 2.55 |
| Commercially-available bio-based fluorine-free water repellent Y | 1.36 | 0.53 | 0.98 | 2.46 |

*The assays are conducted by following the rules of "AATCC-173 CMC: Calculation of Small Color Differences for Acceptability," using Datacolor 500UV to measure the color difference ΔE between the original fabric and the processed fabric. The higher the value of color difference ΔE is, the larger is the difference between the color of the original fabric and the color of the processed fabric. The higher value means a worse performance.

Table 4 shows that an increase of the fatty acid-substituted glycolipid content has a marked impact on color difference, thereby allowing the color difference of sample F (to which 7 parts by weight of fatty acid-substituted glycolipid is added) to be markedly superior to the color difference of sample A (free of fatty acid-substituted glycolipid) and thus less likely to change color. Alternatively, preferred color difference is attained by increasing the proportion of water-borne polyurethane intermediates (samples D, E, F) in the bio-based polyurethane-acrylic hybrid fluorine-free water repellent. Furthermore, the color difference of samples A-F of this embodiment is superior to that of commercially-available bio-based products.

Embodiment 4: Assay and Comparison of the Versatility of the Bio-Based Polyurethane-Acrylic Hybrid Fluorine-Free Water Repellent In addition to bio-based polyurethane-acrylic hybrid fluorine-free water repellent samples A-F and commercially-available bio-based fluorine-free water repellents X, Y used in embodiment 1, embodiment 4 involves assaying fabric/texture versatility of a commercially-available non-bio-based fluorine-free water repellent Z (i.e., nine samples in total). The purpose of the inclusion of non-bio-based fluorine-free water repellent Z in embodiment 4 is as follows: petrochemical ingredients for use in non-bio-based products are free of impurities or isomers, and thus the properties (including water-repelling performance, fabric/texture versatility, and stability) of non-bio-based products is usually better than that of bio-based products. The results of comparison are shown in Table 5 below.

TABLE 5

Results of assays of water repellent fabric/texture versatility

| | Polyester fabric[1] | Nylon fabric[1] | Cotton fabric[1] | Shoe[2] | Zipper[1] | Shoelace[2] |
|---|---|---|---|---|---|---|
| Bio-based fluorine-free water repellent sample A | 100 | 100 | 90 | 0.8 cm | 90− | 0.9 cm |
| Bio-based fluorine-free water repellent sample B | 100 | 100 | 90+ | 0.5 cm | 90 | 0.6 cm |
| Bio-based fluorine-free water repellent sample C | 100 | 100 | 90+ | 0.5 cm | 90 | 0.4 cm |
| Bio-based fluorine-free water repellent sample D | 100 | 100 | 100 | 0 cm | 100 | 0 cm |
| Bio-based fluorine-free water repellent sample E | 100 | 100 | 100 | 0 cm | 100 | 0 cm |
| Bio-based fluorine-free water repellent sample F | 100 | 90+ | 90 | 0.3 cm | 90 | 0.2 cm |
| Commercially-available bio-based fluorine-free water repellent X | 90+ | 90+ | 80+ | >1 cm | 80+ | >1 cm |
| Commercially-available bio-based fluorine-free water repellent Y | 100 | 90+ | 90 | 0.8 cm | 90 | 0.7 cm |

TABLE 5-continued

Results of assays of water repellent fabric/texture versatility

| | Polyester fabric[1] | Nylon fabric[1] | Cotton fabric[1] | Shoe[2] | Zipper[1] | Shoelace[2] |
|---|---|---|---|---|---|---|
| Commercially-available non-bio-based fluorine-free water repellent Z[3] | 100 | 100 | 90+ | 0.4 cm | 90 | 0.5 cm |

[1]The assays are conducted by following the rule of "AATCC-22 Water Repellency: Spray Test."
[2]Static and dynamic wicking test: using Bally test method - bending the fabric 1500 instances, and then carries out AATCC-197 (vertical wicking of textiles) option B test method. The less the wicking height is, the better the anti-wicking performance is.
[3]Commercially-available non-bio-based fluorine-free water repellent: water repellent without bio-based content certification.

Table 5 shows that the bio-based polyurethane-acrylic hybrid fluorine-free water repellents A-F of the disclosure achieve excellent water-repelling performance on various substrates. Furthermore, fabric/texture versatility of a bio-based polyurethane-acrylic hybrid fluorine-free water repellent can be enhanced by increasing the proportion of waterborne polyurethane intermediates (samples D, E, F) in the bio-based polyurethane-acrylic hybrid fluorine-free water repellent. In this embodiment, the fabric/texture versatility of bio-based polyurethane-acrylic hybrid fluorine-free water repellent samples A-F of the disclosure are superior to commercially-available bio-based fluorine-free water repellents X,Y and even superior to commercially-available non-bio-based fluorine-free water repellent Z.

According to the results shown in Table 5, among sample D, E,F (waterborne polyurethane intermediates and acrylic water repellents are of equal proportion), samples D, E have better water-repelling properties and fabric/texture versatility. Sample F contains a relatively larger amount of fatty acid-substituted glycolipid and thus exhibits a slight reduction in water-repelling performance but is still equal to or superior to commercially-available bio-based and non-bio-based fluorine-free water repellents.

Embodiment 5: Assay and Comparison of the Stability of the Bio-Based Polyurethane-Acrylic Hybrid Fluorine-Free Water Repellent Nine water repellent samples, namely bio-based polyurethane-acrylic hybrid fluorine-free water repellent samples A-F of the disclosure and commercially-available water repellents X, Y, Z, are placed in transparent containers, respectively, at room temperature (25° C.) and 60° C. for 30 days, 60 days, 90 days, and 180 days. Then, using naked eye to observe whether insoluble precipitates are produced and found at the bottoms of the containers, on the surfaces of walls of the containers, or on liquid-air interfaces. The results are shown in Table 6 below.

TABLE 6

Results of assays of water repellent stability

| | 25° C. | | | | |
|---|---|---|---|---|---|
| | 0 day | 30 days | 60 days | 90 days | 180 days |
| Commercially-available bio-based water repellent X | ○ | ○ | ○ | ○ | x |

TABLE 6-continued

Results of assays of water repellent stability

| | | | | | |
|---|---|---|---|---|---|
| Commercially-available bio-based water repellent Y | ○ | ○ | x | x | x |
| Commercially-available non-bio-based water repellent Z | ○ | ○ | ○ | ○ | x |
| Bio-based fluorine-free water repellent sample A | ○ | ○ | ○ | ○ | x |
| Bio-based fluorine-free water repellent sample B | ○ | ○ | ○ | ○ | x |
| Bio-based fluorine-free water repellent sample C | ○ | ○ | ○ | ○ | x |
| Bio-based fluorine-free water repellent sample D | ○ | ○ | ○ | ○ | ○ |
| Bio-based fluorine-free water repellent sample E | ○ | ○ | ○ | ○ | ○ |
| Bio-based fluorine-free water repellent sample F | ○ | ○ | ○ | ○ | ○ |

| | 60° C. | | | | |
|---|---|---|---|---|---|
| | 0 day | 30 days | 60 days | 90 days | 180 days |
| Commercially-available bio-based water repellent X | ○ | ○ | ○ | x | x |
| Commercially-available bio-based water repellent Y | ○ | ○ | x | x | x |
| Commercially-available non-bio-based water repellent Z | ○ | ○ | ○ | ○ | x |
| Bio-based fluorine-free water repellent sample A | ○ | ○ | ○ | x | x |
| Bio-based fluorine-free water repellent sample B | ○ | ○ | ○ | x | x |
| Bio-based fluorine-free water repellent sample C | ○ | ○ | ○ | ○ | x |
| Bio-based fluorine-free water repellent sample D | ○ | ○ | ○ | ○ | x |
| Bio-based fluorine-free water repellent sample E | ○ | ○ | ○ | ○ | x |
| Bio-based fluorine-free water repellent sample F | ○ | ○ | ○ | ○ | ○ |

○: Passing the stability assay, and no insoluble precipitates are found.
x: Failed to pass the stability assay, and insoluble precipitates are found.

As shown in Table 6, bio-based polyurethane-acrylic hybrid fluorine-free water repellent samples A-F of the disclosure have markedly higher stability than commercially-available fluorine-free water repellents X, Y, Z and thus still do not produce insoluble precipitates even 90 days later.

As indicated by a comparison of fluorine-free water repellent samples D, E, F, water repellents that contain fatty acid-substituted glycolipid exhibit enhanced stability, and the stability increases with the amount of the fatty acid-substituted glycolipid contained in the water repellents. The comparison shows that fluorine-free water repellent sample F, whose fatty acid-substituted glycolipid content is the highest, i.e., 7 parts by weight, does not produce any insoluble precipitates even 180 days later, thereby exhibiting a high level of stability.

Embodiment 6: Comparison of the Biomass Content of the Water Repellent

As indicated by assays of the biomass content of bio-based polyurethane-acrylic hybrid fluorine-free water repellent samples A-F of the disclosure and commercially-available water repellents X, Y, Z, bio-based polyurethane-acrylic hybrid fluorine-free water repellent samples A-F have a higher biomass content than commercially-available water repellents X, Y, Z. In particular, water repellent samples E, F even have a biomass content as high as 80%. The results are shown in Table 7 below.

TABLE 7

Results of assays of biomass content

| Sample | Bio-based carbon content |
|---|---|
| Commercially-available water repellent X | 50% |
| Commercially-available water repellent Y | 58% |
| Commercially-available water repellent Z | 23% |
| Bio-based fluorine-free water repellent sample A | 64% |
| Bio-based fluorine-free water repellent sample B | 67% |
| Bio-based fluorine-free water repellent sample C | 68% |
| Bio-based fluorine-free water repellent sample D | 78% |
| Bio-based fluorine-free water repellent sample E | 84% |
| Bio-based fluorine-free water repellent sample F | 86% |

[1]The assays are conducted by following the rules of % Biobased carbon content ASTM D6866-21 Method B(AMS)

In conclusion, a bio-based polyurethane-acrylic hybrid fluorine-free water repellent obtained with a method of preparing a bio-based polyurethane-acrylic hybrid fluorine-free water repellent according to the disclosure has appropriate ingredients proportions so that various raw materials form, in a rection, a micellar structure enclosing emulsifier, polyurethane and acrylic. Thus, all ingredients with low water solubility can be uniformly distributed in the water repellent to form a stable emulsified solution and thereby overcome drawbacks of prior art, namely low water repellent stability and unreliable water-repelling performance caused by the use of bio-based ingredients. Therefore, the bio-based polyurethane-acrylic hybrid fluorine-free water repellent exhibits excellent performance even with high biomass content. Furthermore, the bio-based polyurethane-acrylic hybrid fluorine-free water repellent of the disclosure not only surpasses existing commercially-available bio-based and non-bio-based fluorine-free water repellents in water-repelling characteristics, color difference, fabric/texture versatility, stability and biomass content but is also environmentally-friendly, easy to prepare with a preparation method, and cheap to produce.

Persons having ordinary skilled in the art understand that various changes can be made to the embodiments of the disclosure without departing from the spirit of the disclosure. Therefore, the scope of legal protection for the disclosure is not restricted to the embodiments but shall be defined by the appended claims.

What is claimed is:

1. A method of preparing a bio-based waterborne polyurethane intermediate, comprising the following steps:
   (a) mixing 2.0 to 10.0 parts by weight of bio-based isocyanate compound, 10.0 to 20.0 parts by weight of sorbitol, 1.0 to 7.0 parts by weight of fatty acid-substituted glycolipid, 1.0 to 10.0 parts by weight of dihydroxyl-terminated polydialkylsiloxane, and 5.0 to 15.0 parts by weight of a solvent;
   (b) adding 0.05 to 0.3 part by weight of a first initiator to a mixture of step (a) to carry out polymerization; and
   (c) adding 50.0 to 70.0 parts by weight of water, 1.0 to 4.0 parts by weight of an emulsifier, and 0.2 to 0.8 part by weight of acetic acid to a product of step (b) to form the bio-based waterborne polyurethane intermediate.

2. The method of claim 1, wherein the bio-based isocyanate compound is bio-based pentamethylene diisocyanate, bio-based pentamethylene diisocyanate trimer, or a combination thereof.

3. The method of claim 1, wherein the sorbitol is sorbitan monostearate, sorbitan tristearate, or a combination thereof.

4. The method of claim 1, wherein the fatty acid-substituted glycolipid is a $C_{16}$-$C_{70}$ fatty acid-substituted glycolipid, with the substituent involving at least one fatty acid group derived from stearic acid, lauric acid or palmitic acid.

5. The method of claim 4, wherein the fatty acid-substituted glycolipid has a structure depicted below:

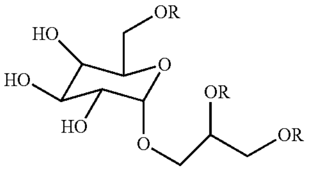

R = H, $OC(CH_2)_nCH_3$ where R is H or —$OC(CH_2)_nCH_3$, and n is 3 to 20.

6. The method of claim 1, wherein the bio-based isocyanate compounds, the sorbitan stearate compounds, and the fatty acid-substituted glycolipid each have a biomass content of 50% to 100%.

7. The method of claim 1, wherein the dihydroxyl-terminated polydialkylsiloxane is dihydroxyl-terminated polydimethylsiloxane of a weight-average molecular weight of 200 to 4000.

8. The method of claim 1, wherein the first initiator is a thermal initiator with an initiation temperature of 30 to 90° C.

9. The method of claim 8, wherein the first initiator is tetrabutyl titanate.

10. A bio-based waterborne polyurethane intermediate prepared by the method of claim 1.

11. A method of preparing a bio-based polyurethane-acrylic hybrid fluorine-free water repellent, comprising the following steps:
   (a) mixing 5.0 to 20.0 parts by weight of wax, 5.0 to 10.0 parts by weight of unsaturated monomers, 3.0 to 6.0 parts by weight of a solvent, 60.0 to 75.0 parts by weight of water, and 1.0 to 4.0 parts by weight of an emulsifier;
   (b) adding 0.1 to 0.5 part by weight of a second initiator to a mixture of step (a) to carry out polymerization and thereby obtaining a water repellent; and (c) mixing 1.0 to 99.0 parts by weight of the water repellent of step (b), 1.0 to 99.0 parts by weight of the waterborne polyurethane intermediate of claim 10, and 0.1 to 0.5 part by weight of a third initiator to carry out polymerization and thereby obtaining the bio-based polyurethane-acrylic hybrid fluorine-free water repellent.

12. The method of claim 11, wherein step (c) occurs at 50 to 90° C. and 0.5 to 2.0 $kgf/cm^2$.

13. The method of claim 11, further comprising the step of:

(d) mixing the bio-based polyurethane-acrylic hybrid fluorine-free water repellent of step (c) with a binder.

14. The method of claim 11, wherein the bio-based isocyanate compounds, the sorbitan stearate compound, and the fatty acid-substituted glycolipid each have a biomass content of 50% to 100%.

15. A bio-based polyurethane-acrylic hybrid fluorine-free water repellent prepared by the method of claim 11.

16. The bio-based polyurethane-acrylic hybrid fluorine-free water repellent of claim 15, wherein the bio-based isocyanate compound, the sorbitan stearate compounds, and the fatty acid-substituted glycolipid each have a biomass content of 50% to 100%.

17. The bio-based polyurethane-acrylic hybrid fluorine-free water repellent of claim 15, wherein its biomass content is greater than 60%.

18. A surface-modified article, comprising a substrate having a surface coated with the bio-based polyurethane-acrylic hybrid fluorine-free water repellent of claim 15.

19. The surface-modified article of claim 18, wherein the substrate is fabric, leather, paper, or a combination thereof.

* * * * *